United States Patent [19]

Oshima

[11] Patent Number: 4,808,056
[45] Date of Patent: Feb. 28, 1989

[54] ELEVATOR DEVICE TRANSPORTABLE IN A MOTOR VEHICLE

[76] Inventor: Shinnosuke Oshima, No. 1823, Shin-Machi, Tano-Gun, Gunma-Ken, Japan

[21] Appl. No.: 151,478

[22] Filed: Feb. 2, 1988

[30] Foreign Application Priority Data

Aug. 18, 1987 [JP] Japan .................. 62-203389

[51] Int. Cl.⁴ .................. B60R 5/04; B60P 1/44
[52] U.S. Cl. .................. 414/462; 414/917; 414/921; 414/556
[58] Field of Search .............. 414/545, 462, 546, 547, 414/556, 557, 917, 921

[56] References Cited

U.S. PATENT DOCUMENTS

| | | | |
|---|---|---|---|
| 2,091,070 | 8/1937 | Girl | 414/462 |
| 3,589,537 | 6/1971 | Petersen | 414/545 X |
| 4,113,121 | 9/1978 | Collins et al. | 414/545 |
| 4,299,528 | 11/1981 | Kazeil et al. | 414/546 |
| 4,325,668 | 4/1982 | Julian et al. | 414/546 |
| 4,344,508 | 8/1982 | Peck | 414/546 X |
| 4,671,387 | 1/1987 | Bourgeois | 414/545 |

FOREIGN PATENT DOCUMENTS

| | | | |
|---|---|---|---|
| 658618 | 2/1963 | Canada | 414/462 |
| 49193 | 4/1982 | European Pat. Off. | 414/547 |
| 2084539 | 4/1982 | United Kingdom | 414/547 |

*Primary Examiner*—Robert J. Spar
*Assistant Examiner*—James R. Bidwell
*Attorney, Agent, or Firm*—Michael J. Striker

[57] ABSTRACT

An elevator device insertable into and transportable in a motor vehicle for lifting and lowering heavy loads comprises a base plate, a main frame and an additional frame, and an elevating arrangement positioned between said frames. The elevating arrangement is foldable to vertically stand and lean against the main frame while in non-use position, and unfoldable to lie horizontally on a connecting shaft in a stable use position. Each frame is provided with a parallelogram link mechanism and the elevator arrangement is provided with a pressure air cylinder-piston unit operated to compensate for the weight of the elevator arrangement to enable one to easily place the arrangement to one of said positions.

7 Claims, 6 Drawing Sheets

ELEVATOR DEVICE TRANSPORTABLE IN A MOTOR VEHICLE

BACKGROUND OF THE INVENTION

The present invention relates to an elevator device which can be inserted into an automobile through a rear opening thereof.

Conventional elevator devices of the foregoing type which have been inserted through the rear opening of the motor vehicle have been considered as troublesome in operation due to their instability, particularly in case a person or a weighty load has been placed on such elevator device because such conventional devices are of one side-supported type.

SUMMARY OF THE INVENTION

It is an object of the present invention to provide an improved elevator device transportable in motor vehicles.

It is another object of this invention to provide a very stable elevator device which is easy to operate.

Yet another object of the invention is to provide an elevator device which does not occupy a great deal of space when installed in the motor vehicle.

These and other objects of the invention are attained by an elevator device to be positioned in a motor vehicle through a rear opening thereof, comprising a base plate; frame means including a main frame positioned at one side of said base plate and an additional frame positioned at an opposite side of said base plate, each frame being provided with a parallelogram link mechanism and a pressure oil cylinder-piston unit having a cylinder and a piston, each link mechanism including two brackets spaced from each other and rigidly connected to said base plate, two link members spaced from each other and pivotally connected to said brackets, respectively, and an intermediate link arm pivotally connected to said link members, said cylinder of each cylinder-piston unit being pivotally connected to one of said link members and said piston of said unit being pivotally connected to another of said link members so that each parallelogram link mechanism is opened by contraction of said piston rod in said cylinder and closed by extension of said piston rod from the cylinder whereby two link arms are moved to one end position when said piston rod is contracted and to another end position when said piston rod is extended from said cylinder; a connecting shaft which connects two ends of said link arms to each other so as to synchronize movements thereof, said link arm of the link mechanism of said main frame being provided with two lever plates at two sides thereof and pivotally supported on a pivot axle extending through said link arm, and a pressure air cylinder-piston unit having a cylinder pivotally connected to said link arm and a piston rod connected to one of said lever plates; and elevator means including a main platform, a folding platform pivotally connected to said main platform and a flap pivotable to said folding platform, said main platform being rigidly connected to said lever plates; said pressure air cylinder unit compensating for weight of said elevator means so that the latter can be manually raised to stand vertically to lean against said main frame or lowered to lie horizontally on said connecting shaft, said elevator means being triple-foldable in combination with said link arm of said main frame to stand in a vertical non-use position and being supported by said link arm of said additional frame to extend in a horizontal use position.

Said two link members in each parallelogram link mechanism may be of equal length.

The intermediate link arm of each parallelogram link mechanism may be a bent element.

Said two lever plates may be identical.

The device may further include a hook fixed to said link arm of said main frame and a hook receiver fixed to said folding platform and engageable with said hook.

The device may further include hook means for engaging one of said link members of said main frame with said link arm of said main frame, said hook means including a hook fixed to said one of said link members, a supporting plate fixed to said link arm and having a holding projection and a pawl plate pivotally supported on said supporting plate, and a spring-biased pivotable hook receiver provided with a pawl and a recess, said pawl plate being engageable with said pawl so as to hold said hook received in said recess by said holding projection.

The elevator device may include additional hook means for engaging said elevator means in said use laid position to said link arm of said additional frame, said additional hook means including a spring-biased hook-shaped lever connected to said main platform, and a hook receiver attached to said additional frame and engageable with said hook-shaped lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
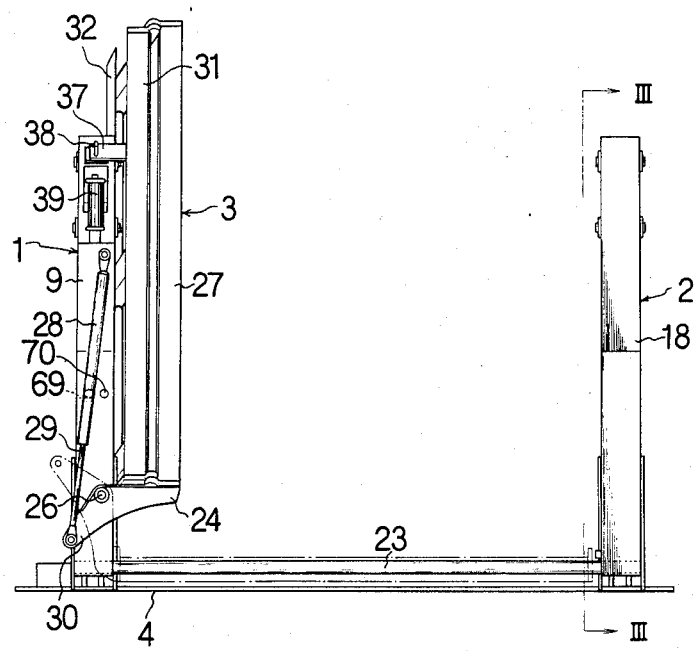
FIG. 1 is a rear view of the elevator device according to the invention.

Referring now to the drawings in detail, and firstly to FIG. 1 thereof, it will be seen that an elevator device which is an independent unit which can be easily fitted in an automobile, namely on the floor thereof inside the rear opening of the vehicle, comprises a left-hand main side frame 1, a right-hand additional or subordinate side frame 2 and an elevator device itself designated at 3.

Figure 2:
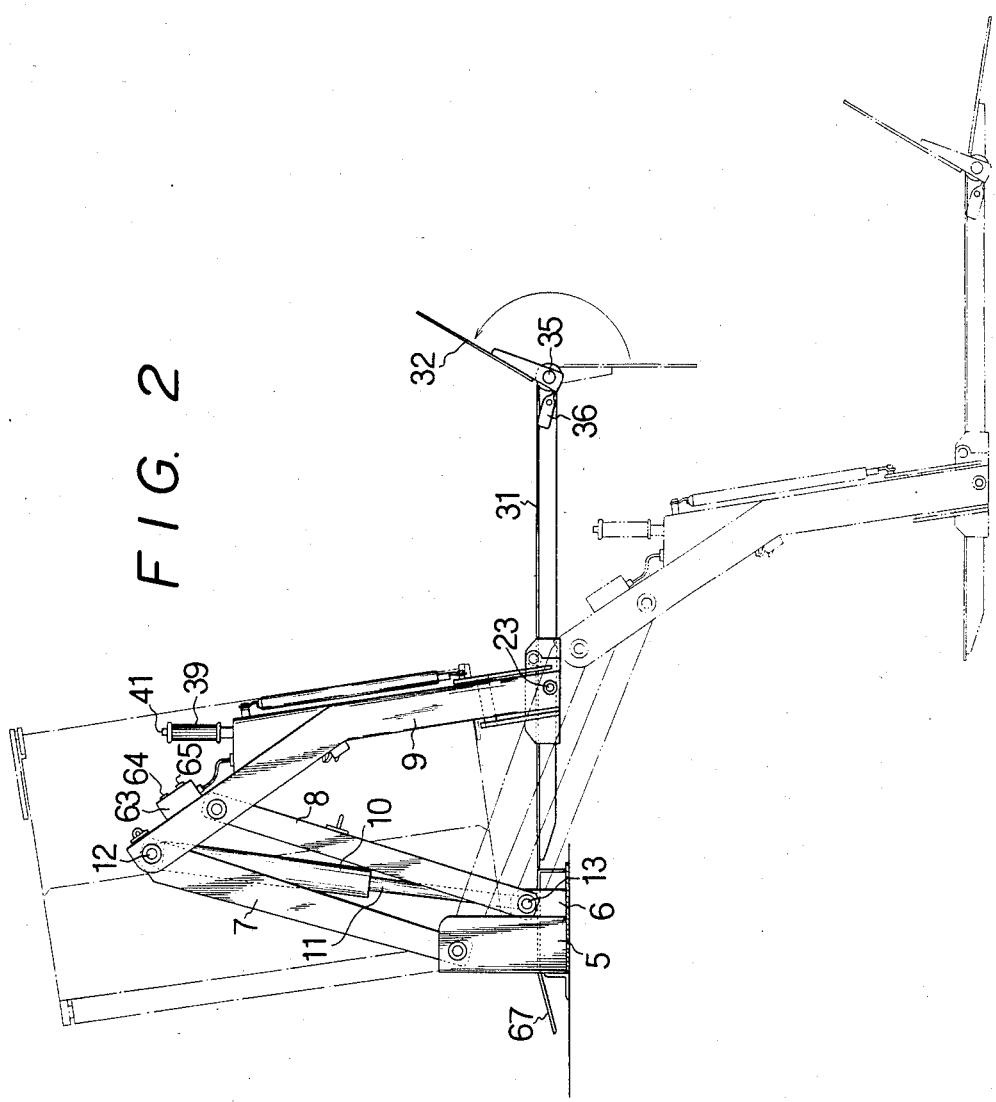
FIG. 2 is a side view of the elevator device in an unfolding, pulling out and extending conditions.
Figure 5:
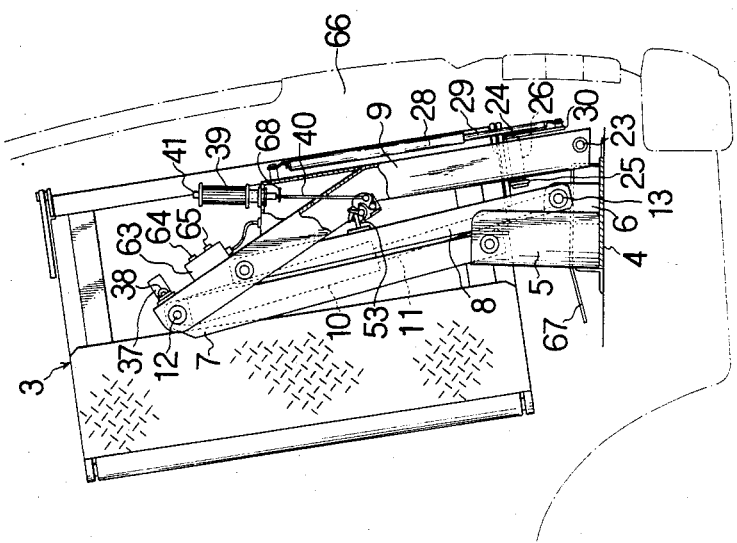
FIG. 5 is a side view of the elevator device in the folded position and in the position vertically supported on the left side of a rectangular bottom base plate.

The elevator device, which is normally utilized for lifting up weighty loads from a lower level to a higher level or lowering loads from a higher level to a lower level, further includes a substantially rectangular base or bottom plate 4. Both side frames 1 and 2 stand vertically at the left-hand and right-hand sides of the base plate 4 as a pair of gateposts. Frames 1 and 2 have each a symetrically located parallelogram link mechanism which is shown also in FIG. 2. The parallelogram link mechanism of the main side frame 1 includes a first front bracket 5, a second rear bracket 6, two front and rear, respectively, link members 7 and 8 of the same length and an intermediate bent link arm 9, connected to each other to form a parallelogram as shown in FIGS. 2 and 5. Brackets 5 and 6 are connected to the base plate 4 at the front and rear end thereof whereas two link members 7 and 9 are pivotally supported at the upper ends of brackets 7 and 8, respectively. Link members 7 and 8 are also pivotally supported at their upper ends to the upper half of the intermediate link arm 9.

A pressure oil cylinder 10 and its piston rod 11 are pivotally supported, at their upper and lower ends, respectively, on a pivot axle 12 of the front link member 7, and a pivot axle 13 of the rear link member 8.

Figure 3:
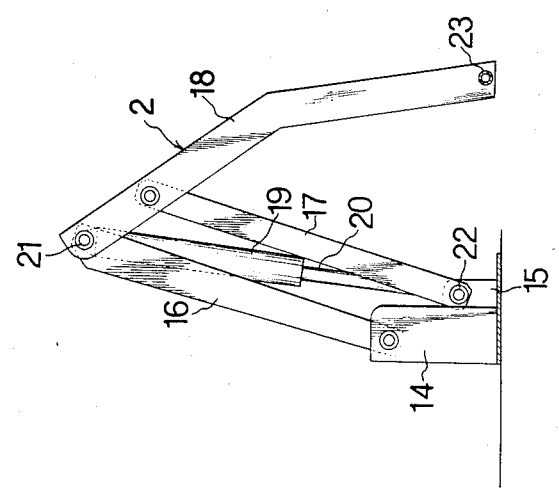
FIG. 3 is a partial side view of the side subframe of the elevator device of this invention, as seen from line III—III of FIG. 1.

With reference to FIG. 3 it will be seen that the additional frame 2 provided at the right-hand side of base plate 4 includes a front bracket 14 extended upwardly of base plate 4 and a rear bracket 15 of the height smaller than that of bracket 14. Furthermore the parallelogram link mechanism of the additional frame 2 includes a front link member 16 pivotally connected to bracket 14 a rear link member 17 pivotally connected at a joint 22 to the bracket 15 and a bent intermediate link arm 18 pivotally connected at joint 21 to the link member 16 and also pivotally connected at the upper portion thereof to the link member 17. A pressure oil cylinder 19 is pivotally supported at its upper end at joint 21 whereas the piston rod 20 of this cylinder is pivotally supported with its lower end at joint 22 on the bracket 15.

Two frames 1 and 2 are indirectly connected to each other by rigidly connecting the lower ends of the link arm 9 and the link arm 18 to the opposite ends of a connecting shaft 23 so as to synchronize the movements of the link mechanisms of both frames. As shown in FIG. 5 the supporting lever-like plates 24 and 25 are journaled on the front and back faces of the lower portion of the intermediate link arm 9 at a supporting axle 26.

Referring back to FIG. 1 it will be seen that the elevator device itself denoted by reference numeral 3 has a main platform 27 which is welded to the inner ends of the supporting plates 24 and 25. The elevator device 3 may extend vertically while contacting the main frame 1 or horizontally while lying on the connecting shaft 23.

As further shown in FIG. 1 an air cylinder 28 is connected to the rear face of the link arm 9 at the upper end thereof whereas its piston rod 29 is connected at the lower end thereof to an extension 30 of the supporting plate 24. The air cylinder 28 and its piston rod 29 may act to compensate for and diminish the weight of the elevator device 3 and may raise or lower the elevator device 3 smoothly and easily.

Figure 4:
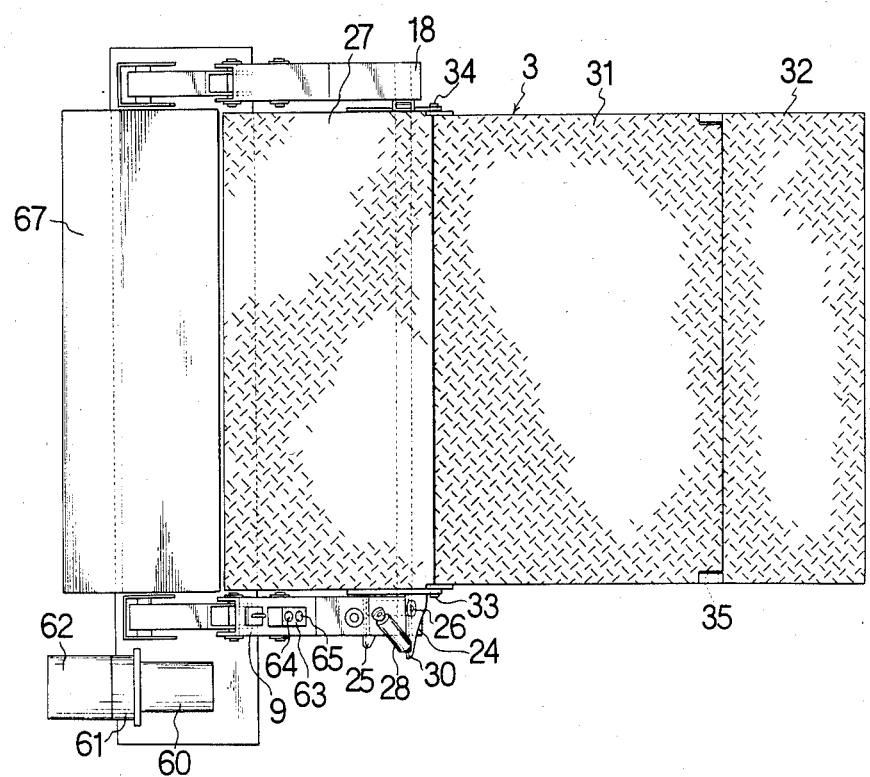
FIG. 4 is a top plan view of the elevator device.
Figure 7:
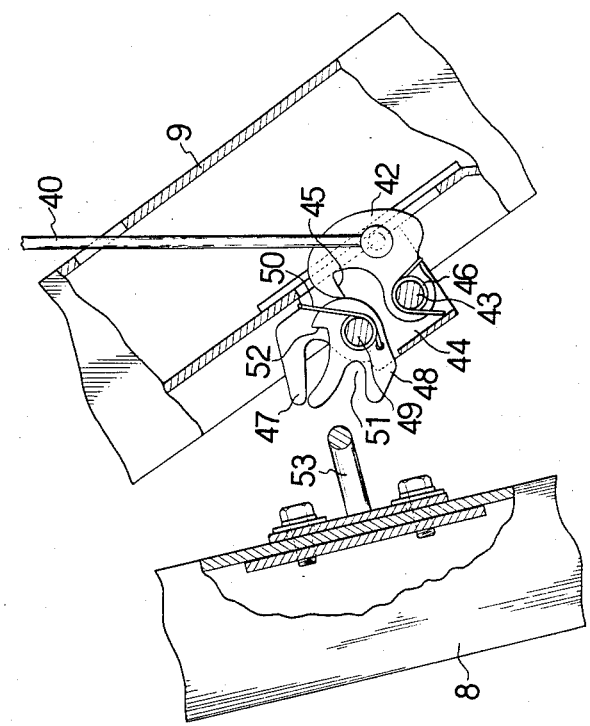
FIG. 7 is a view similar to that of FIG. 6 but of the hooking mechanism in a released position.
Figure 6:
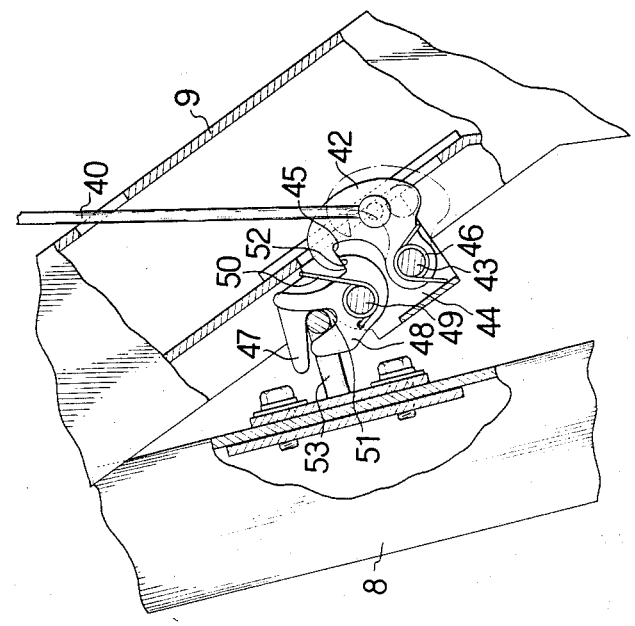
FIG. 6 is a partially sectional, enlarged side view of a hooking mechanism also shown in FIG. 5, in a locked position.
Figure 10:
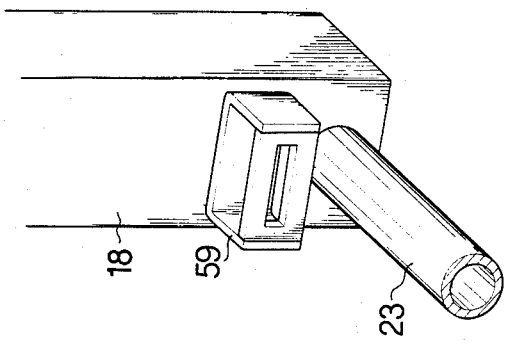
FIG. 10 is a perspective view of the member of the hooking mechanism attached to the right-hand link arm.
Figure 9:
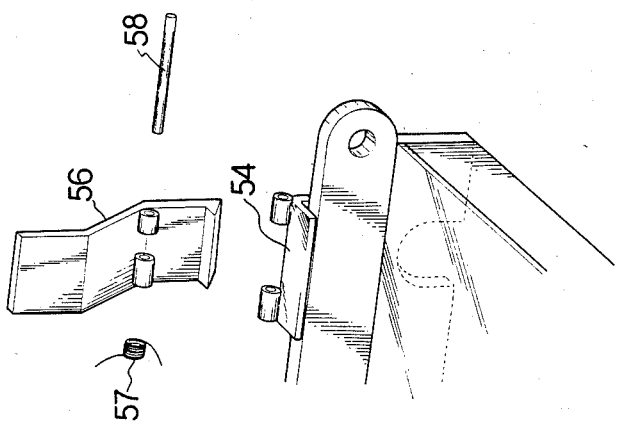
FIG. 9 is an exploded perspective view of the hooking mechanism.
Figure 8:
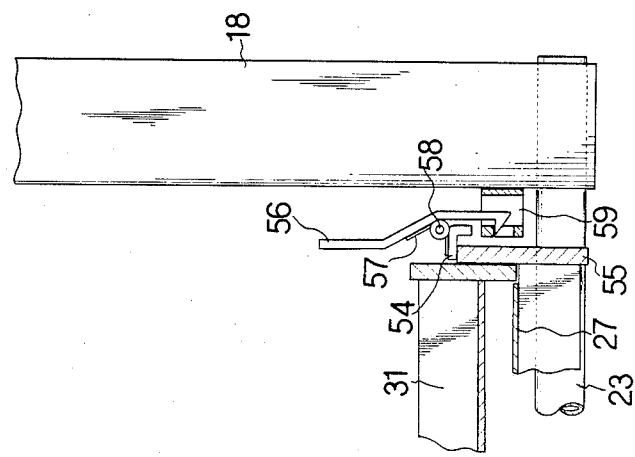
FIG. 8 is an enlarged partially sectional view of the right-hand link arm of the side subframe with the elevator device.

In addition to the main platform 27, the elevator device 3 comprises a folding platform 31 which is terminated with a pivotable flap 32 as shown in FIG. 2. The folding platform 31 is connected with main platform 27 at the rear edge thereof by two opposite connecting axles 33 and 34 as shown in FIG. 4. The folding platform 31 may be twice folded relative to the main platform 27. The flap 32 is connected to the folding platform 31 at the rear edge thereof at a joint 35 and is adapted to pivot upwardly by a necessary angle by a lever-shaped stopper 36 attached to the joint or axle 35 so as to prevent its falling from the folding platform 31. Also shown in FIG. 5 is a hook receiver 37 which is fixed to the back side of the folding platform 31 whereas a hook 38 is fixed to the upper back face of the link arm 9. The hook receiver 37 is engageable with the hook 38. When the elevator device 3 is raised on the side of the link arm 9, the engagement of both elements 37 and 38 may be maintained. An operation handle 39 is fixed to the upper back face of the link arm 9. When the operation handle 39 is pulled rearward, the side frames 1 and 2 and all elements connected therewith are moved rearwardly by the aforedescribed parallelogram link mechanisms of both side frames 1 and 2. When the operation handle 39 is pushed forward, both side frames 1 and 2 are returned to the original position. The operation handle 39 is connected to a push-rod 40 which extends through the handle 39 and is terminated with a knob 41 on its upper end. The lower end of the push-rod 40 is inturn journaled in a pawl plate 42 as shown in detail in FIGS. 6 and 7. The pawl plate 42 is supported on a supporting axle 43 of a fixed supporting plate 44. The pawl plate 42 is formed so as to pivot downward by pushing down the push-rod 40 by means of handle 39 on the supporting axle 43. Pawl plate 42 has a pawl 45. The fixed supporting plate 44 carries a spring 46 wound around the supporting axle 43 and has a projection 47. A pivotable hook receiver 48 is supported on the fixed supporting plate 44 by a joint or axle 49 which is wrapped with a spring 50. Hook receiver 48 has a depression or recess 51 and a pawl 52. A hook 53 is fixed to the back face of the rear link member 8. Hook 53 can be caught or engaged in depression 51 upon pivoting of the hook receiver, and engaged with the projection 47. As further shown in FIGS. 8–10, a bracket 54 is fixed to the upper end of a side plate 55 of the main platform 27, opposite the bent link arm 18 of frame 2. A hook-shaped lever 56 is pivotally supported on the bracket 54 and is pressed to the side plate 55 of the main platform 27 by a spring 57 wound on an axle 58 of the hook-like lever 56. The lower end or hook of lever 56 is engageable by a hook receiver 59 which is fixed to the wall of the lower portion of the bent link arm 18.

Referring back to FIG. 4, it can be seen that an electric motor 60, a pressure oil pump 61, an oil tank 62 and a switch box 63 are attached to the upper surface of the intermediate link arm 9. By pushing an elevating switch button 64 attached to the switch box 63, a conventional and therefore non-shown solenoid valve is opened and thereby oil is fed to the pressure oil cylinders 10 and 19 of the parallelogram link mechanisms so that cylinders 10 and 19 are actuated and the elevator device 3 is raised up. By pushing a further switch button 65 for lowering the elevator device, the motor 60 is made to stop and an oil circuit between the pressure oil cylinders 10 and 19 and the pressure oil tank 62 is opened, and a constant flow of oil is returned to the pressure oil tank 62 and the elevator means 3 is lowered. As the elevator device 3 is positioned on the rectangular bottom or base plate 4, in case that this device is inserted inside a body 66 of the automobile (FIG. 5), the bottom or base plate 4 is fixed to the floor of the automobile and a connecting plate 67 is provided between the floor of the body 66 and the main platform 27.

The mode of operation of the device of the invention is as follows: In order to pull the elevator device out of the automobile body 66, the operation handle 39 is gripped by a user and the knob 41 is pushed down so that the push rod 40 forces the pawl plate 42 to pivot downwards so that the pawl 45 is disconnected from the pawl 52 (FIGS. 6, 7) and the hook receiver 48 opens while the hook 53 is released from the recess 51 of the hook receiver 48. Simultaneously, a limit switch 68 provided near handle 39 as shown in FIG. 5 is switched o to open the conventional solenoid valve, and the circuit of the pressure oil of the cylinders 10 and 19 is released and oil of the circuit returns into the oil tank 62. Next, the operation handle 39 is pulled slightly rearward, which is aided with an auxiliary force of conventional expansion springs inside the oil cylinders 10 and 19, and then both link arms 9 and 18 are moved backward by turning the link members 7 and 8 of the parallelogram link mechanism of frame 1 and the link members 16 and 17 of the parallelogram link mechanism of frame 2, respectively, on the fulcrums of the brackets 5 and 6 and the brackets 14 and 15, and the elevator means 3 mounted on the link arm 9 of the frame 1 is pulled out while standing vertically in the position shown by dash-dotted line in FIG. 2, and the circuit of the pressure oil is cut and an oil flow in the circuit stops by actuation of the limit switch 68. The main platform 27 and the link arm 9 are released by disconnecting the hook receiver 37 from the hook 38. The elevator device 3 is laid down towards the right side by pivoting by hand the supporting axle 26 until the main platform 27 comes to contact with and becomes supported on the connecting shaft 23, and the hook-like lever 56 journaled on the main platform 27 becomes automatically connected with the hook receiver 59 fixed to the link arm 18. Then the folding platform 31 is unfolded rearward on the supporting axles 33 and 34, and the flap 32 connected to the rear side of the folding platform 31 is positioned obliquely while the lever-like stopper 36 acts on the supporting axle 35 so as to maintain this position. When the elevator device 3 is laid down, its weight is diminished by the air cylinder 28 and its operation is made easy. Limit switches 69 and 70 (FIG. 1) are provided on the rear surface of the link arm 9 so as to prevent opening of the oil circuit of the cylinders 10 and 19 even if the lowering switch button 65 is pushed by contacting with the piston rod 29. As shown in FIG. 2, the front edge of the main platform 27 is connected with the connecting plate 67 at the same level and the rear edge of the flap 32 is pivoted to a standing position so as to prevent falling down of things loaded on the platform 27, 31. At this stage, by pushing the lowering switch button 65, the oil circuits of the cylinders 10 and 19 are opened, and oil is returned into the oil tank 62 by pressure of the piston rods 11 and 20, and a returned quantity of oil is limited, so the elevator device 3 descends at a predetermined speed until it contacts the floor as shown by a dash-dotted line in FIG. 2. Then the lever-like stopper 36 is disconnected from flap 32 by hand and the flap 32 is released and descends to the ground and becomes a guide plate for the elevate device 3. Therefore, a weighty load, for example a sick person and/or a wheel chair, etc., may be transferred from the ground to the elevator platform without unrest and difficulty.

When the weighty load is mounted on the elevator device 3, the flap 32 is made to stand and the elevating switch button 64 is pushed. The oil circuits of the pressure oil cylinders 10 and 19 are exchanged and the electric motor 60 is moved. Then oil is fed into the cylinders 10 and 19 and the piston rods 11 and 20 pressed by oil protrude outwardly from the cylinders 10 and 19, respectively. Therefore, the distances between the joints 12 and 13 and the joints 21 and 22 become greater, and the link members 7 and 8 and the link members 16 and 17 are pivoted upwardly while the link arms 9 and 18 are also simultaneously pivoted upwardly. Accordingly, the elevator device 3 ascends and when it reaches the level of the connecting plate 67, a limit switch (non-shown but conventional) acts to stop the rotation of the electric motor 60 and shuts off the oil circuits of the pressure oil cylinders 10 and 19. Thereby, the piston rods 11 and 20 maintain the definite position and the elevator device33 stops at the predetermined elevated position. Therefore, the load may be transferred from the elevator device 3 via the connecting plate 67 to the body 66 of the automobile. If the lowering switch button 65 is pushed again, the oil circuits of the oil cylinders 10 and 19 are opened and the elevator device 3 descends due to the above described movement and contacts the ground. Such operations of the lifting and the lowering switch buttons 64 and 65 may elevate and lower the elevator platform between the floor of the automobile and the ground and, therefore, the elevator device may easily raise and lower any load which can hardly be raised by human power.

In order to house the elevator device inside the body 66 of the automobile, the elevator device 3 is raised to the level of the connecting plate 67 on the body 66, and then the lever-like stopper 36 is disconnected from the supporting axle 35; the flap 32 is released and folded on the folding platform 31 which in turn is folded on the main platform 27. Namely, the elevator device 3 is thrice-folded; the lever-like hook 56 is released from the hook receiver 59 by hand and separated from the link arm 18. Then, the folded elevator device 3 is made to stand on the side of the link arm 9 by pivoting on the supporting axle 26 and by holding it by hand. In this case, the elevator device 3 can be slightly raised up on the supporting axle 26 by balancing it by action of the air cylinder 28 and the piston rod 29. In this case, the piston rod 29 will slightly turn to the left, and the limit switch 68 will act to maintain the oil circuit of the oil cylinder 19 in a closed condition. In order to maintain the elevator device 3 in a standing position, the hook receiver 37 is connected with the hook 38. Then, by pushing the elevating switch button 64, the oil circuit of the oil cylinder 19 is opened and the electric motor 60 rotates. Accordingly, by feeding the oil to the cylinders 10 and 19 and by actuating the piston rods 11 and 20, the link members 7 and 8 of frame 1 and the link members 16 and 17 of frame 2 are moved and the elevator device 3 is removed to the front position on the bottom base plate 4 and may be housed inside the body 66. The non-shown but conventional limit switch senses the position of the elevator device 3 and stops the rotation of the electric motor 60, shuts the oil circuit of the pressure oil cylinders 10 and 19 and maintains this condition. Simultaneously, the hook 53 attached to the link member 8 is automatically engaged with the hook receiver 48 attached to the link arm 9 and the oil circuit of the pressure oil cylinder is shut off and this condition is maintained.

As described above, in the elevator device, each parallelogram link mechanism is formed of two link members, two brackets fixed to the rectangular base plate and the intermediate bent link arm, and it is adapted to be actuated by a pressure oil cylinder and piston rod so as to be switched on or shut off, to thereby move the elevator device. All the members of the elevator device are installed on the rectangular bottom or base plate, so the elevator device may be applied to not only the automobile but to any place where there is a difference in height in order to raise or lower a weighty load.

Further, according to the invention, the elevator device is supported by one link arm on the one side of the base plate and triple-folded, so it may vertically stand on the one side of the base plate or horizontally lie between two sides of the base plate. When the elevator device stands vertically on the one side of the base plate, the rear opening of the automobile becomes a free passage between the inside and the outside of the automobile. When the rear opening is closed, the space between the two sides of the automobile may be used to accommodate things. When the elevator device is laid down horizontally on the connecting shaft 23, it may be engaged on the side of the other link arm by the hook of the main platform 27 and the hook receiver of said link arm as if it wee properly fixed to both link arms like a conventional elevator device. Therefore, the platform 27 which is connected with both link arms may be raised or lowered with safety and without fluctuations when a weighty load is placed on it. The elevator device of the present invention may be especially available to load and unload weighty things, for example a sick person in a wheel chair.

It will be understood that each of the elements described above, or two or more together, may also find a useful application in other types of elevator devices transportable in motor vehicles differing from the types described above.

While the invention has been illustrated and described as embodied in a elevator device transportable in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An elevator device to be positioned in a motor vehicle through a rear opening thereof, comprising a base plate; frame means including a main frame positioned at one side of said base plate and an additional frame positioned at an opposite side of said base plate, each frame being provided with a parallelogram link mechanism and a pressure oil cylinder-piston unit having a cylinder and a piston, each link mechanism including two brackets spaced from each other and rigidly connected to said base plate, two link members spaced from each other and pivotally connected to said brackets, respectively, and an intermediate link arm pivotally connected to said link members, said cylinder of each cylinder-piston unit being pivotally connected to one of said link members and said piston of said unit being pivotally connected to another of said link members so that each parallelogram link mechanism is opened by contraction of said piston rod in said cylinder and closed by extension of said piston rod from said cylinder whereby two link arms are moved to one end position when said piston rod is contracted and to another end position when said piston rod is extended from said cylinder; a connecting shaft which connects two ends of said link arms to each other so as to synchronize movements thereof, said link arm of the link mechanism of said main frame being provided with two lever plates at two sides thereof and pivotally supported on a pivot axle extending through said link arm, and a pressure air cylinder-piston unit having a cylinder pivotally connected to said link arm and a piston rod connected to one of said lever plates; and elevator means including a main platform, a folding platform pivotally connected to said main platform and a flap pivotable to said folding platform, said main platform being rigidly connected to said lever plates; said pressure air cylinder unit compensating for weight of said elevator means so that the latter can be manually raised to stand vertically to lean against said main frame or lowered to lie horizontally on said connecting shaft, said elevator means being triple-foldable in combination with said link arm of said main frame to stand in a vertical non-use position and being supported by said link arm of said additional frame to extend in a horizontal use position.

2. The elevator device as defined in claim 1, wherein said two link members in each parallelogram link mechanism are of equal length.

3. The elevator device as defined in claim 1, wherein said intermediate link arm of each parallelogram link mechanism is a bent element.

4. The elevator device as defined in claim 1, wherein said two lever plates are identical.

5. The elevator device as defined in claim 1; further including a hook fixed to said link arm of said main frame and a hook receiver fixed to said folding platform and engageable with said hook.

6. The elevator device as defined in claim 1, further including hook means for engaging one of said link members of said main frame with said link arm of said main frame, said hook means including a hook fixed to said one of said link members, a supporting plate fixed to said link arm and having a holding projection and a pawl plate pivotally supported on said supporting plate, and a spring-biased pivotable hook receiver provided with a pawl and a recess, said pawl plate being engageable with said pawl so as to hold said hook received in said recess by said holding projection.

7. The elevator device as defined in claim 6; including additional hook means for engaging said elevator means in said use laid position to said link arm of said additional frame, said additional hook means including a spring-biased hook-shaped lever connected to said main platform, and a hook receiver attached to said additional frame and engageable with said hook-shaped lever.

* * * * *